United States Patent [19]

Richards

[11] Patent Number: 4,679,754
[45] Date of Patent: Jul. 14, 1987

[54] CONNECTOR ASSEMBLY FOR SECURING CABLES, PIPES, OR THE LIKE TO A SUPPORT STRUCTURE

[76] Inventor: Peter S. Richards, 100 Mt. Si Pl. NW., Issaquah, Wash. 98027

[21] Appl. No.: 889,929

[22] Filed: Jul. 28, 1986

[51] Int. Cl.⁴ .............................................. F16L 3/22
[52] U.S. Cl. .................................. 248/68.1; 24/458; 248/67.7; 248/71; 248/73; 248/231.1
[58] Field of Search ......................... 248/68.1, 67.7, 71, 248/73, 65, 62, 316.1, 231.1, 74.1, 74.4; 24/458, 452, 433, 545, 546, 563; 29/267; 81/485; 174/40 CC

[56] References Cited

U.S. PATENT DOCUMENTS

| | | |
|---|---|---|
| 368,284 | 8/1887 | Fletcher . |
| 540,750 | 6/1885 | Minnemeyer . |
| 670,035 | 3/1901 | Sawyer . |
| 1,309,616 | 7/1919 | Eisler . |
| 1,798,812 | 3/1931 | Rosenbeck . |
| 1,896,864 | 2/1933 | Hall . |
| 2,022,801 | 12/1935 | Conner ................................. 29/148 |
| 2,065,843 | 12/1936 | Van Uum ......................... 248/71 X |
| 2,108,347 | 2/1938 | Quarnstrom ............................ 24/81 |
| 2,286,562 | 6/1942 | Merryweather ...................... 248/65 |
| 2,632,355 | 3/1953 | Becker .................................. 85/32 |
| 2,681,196 | 6/1954 | Lind ..................................... 248/71 |
| 2,992,799 | 7/1961 | Tisdall .................................. 248/71 |
| 3,066,903 | 12/1962 | Tinnerman .......................... 248/300 |
| 3,295,806 | 1/1967 | Modeme ..................... 174/40 CC X |
| 3,298,645 | 1/1967 | Morris ................................... 248/71 |
| 3,576,305 | 4/1971 | Welsh ................................. 248/68.1 |
| 3,582,029 | 6/1971 | Moesta ................................ 248/68.1 |
| 3,633,250 | 1/1972 | Romney ................................. 24/81 |
| 3,934,802 | 1/1976 | Jennings ................................. 248/71 |
| 3,991,960 | 11/1976 | Tanaka ............................... 248/68.1 |
| 4,347,998 | 9/1982 | Loree .................................. 248/68.1 |
| 4,395,009 | 7/1983 | Bormke .............................. 248/68.1 |
| 4,509,242 | 4/1985 | Marra ..................................... 29/267 |
| 4,573,652 | 3/1986 | Richards ........................... 248/62 X |

FOREIGN PATENT DOCUMENTS 2505628  8/1975  Fed. Rep. of Germany ..... 248/74.1

Primary Examiner—Ramon O. Ramirez
Attorney, Agent, or Firm—Delbert J. Barnard

[57] ABSTRACT

Objects (10) to be secured in place relative to a support member (48) are placed on a support portion (16) of a base member (14) which is secured to the support structure (48). A U-shaped retainer (12) is moved into a position with its sidearms (18, 20) on opposite sides of the objects (10) and the ends of the sidearms (18, 20) aligned with slots (36, 38) in the support portion (16). Then, the retainer (12) is pushed endwise, until a cross member (22), innterconnected between the upper ends of the sidearms (18, 20) is down against the objects (10). The movement of the sidearms (18, 20) causes a spreading apart of a pair of flanges (44, 46) which depend from the support portion (16) of base member (14). When the retainer (12) is seated, lower edge portions (40, 43) of the flanges (44, 46) dig into the edges (28, 30 and 32, 34) of the sidearms (18, 20), and securely connect the retainer (12) to the base member (14). Cam tools (98) are provided for spreading the flanges (44, 46) apart, so that the retainer (12) can be quickly and easily pulled away from the base member (14), to in that manner release the objects (10) from the support structure (48).

12 Claims, 14 Drawing Figures

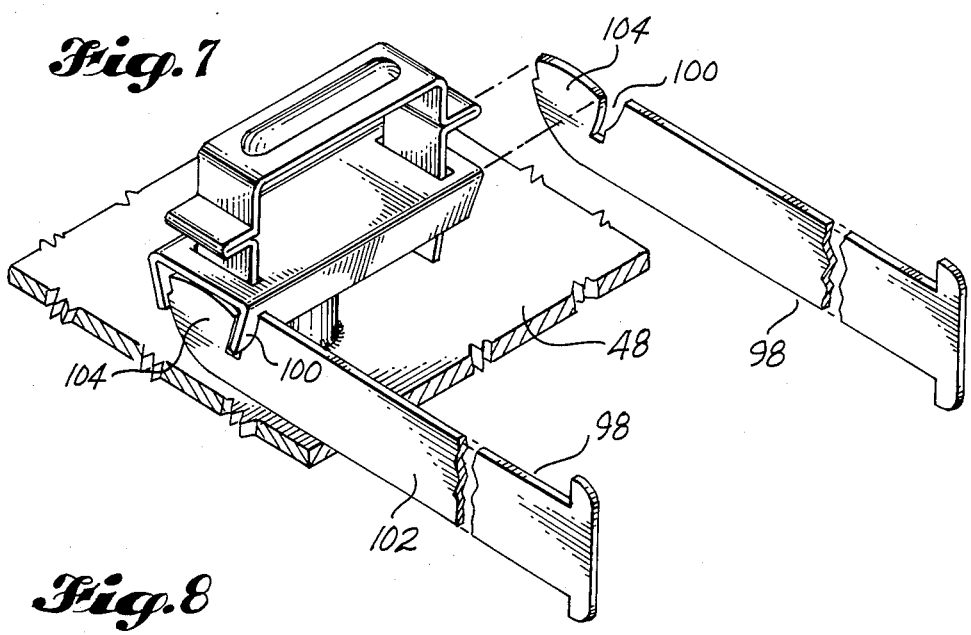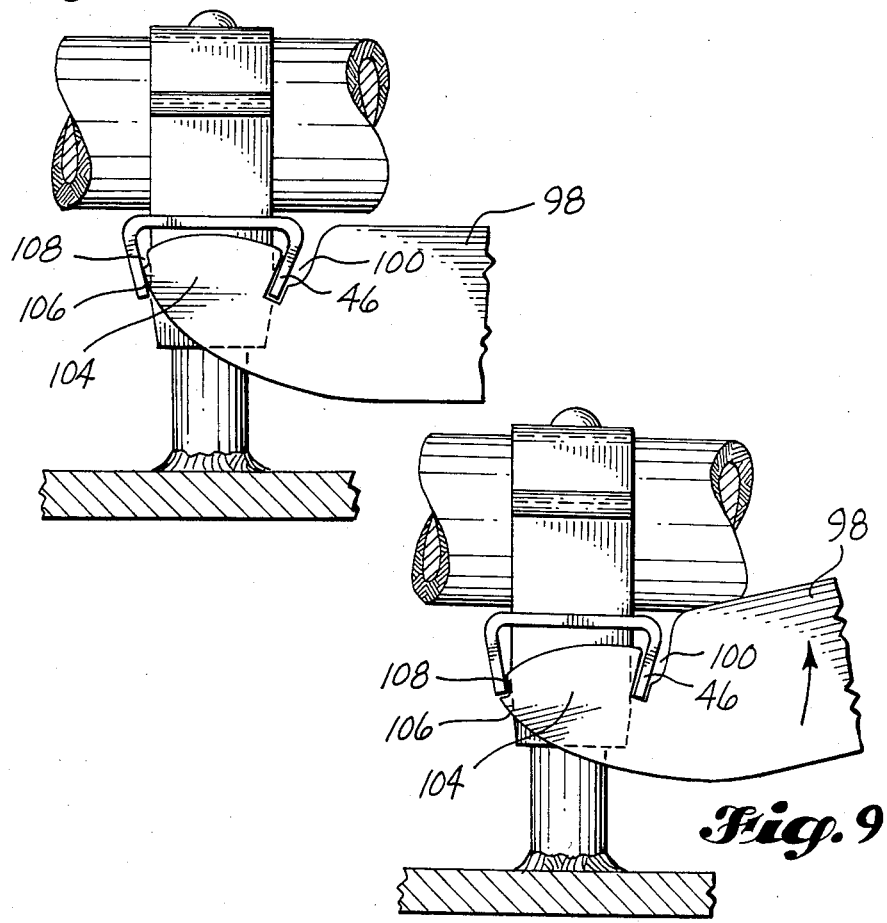

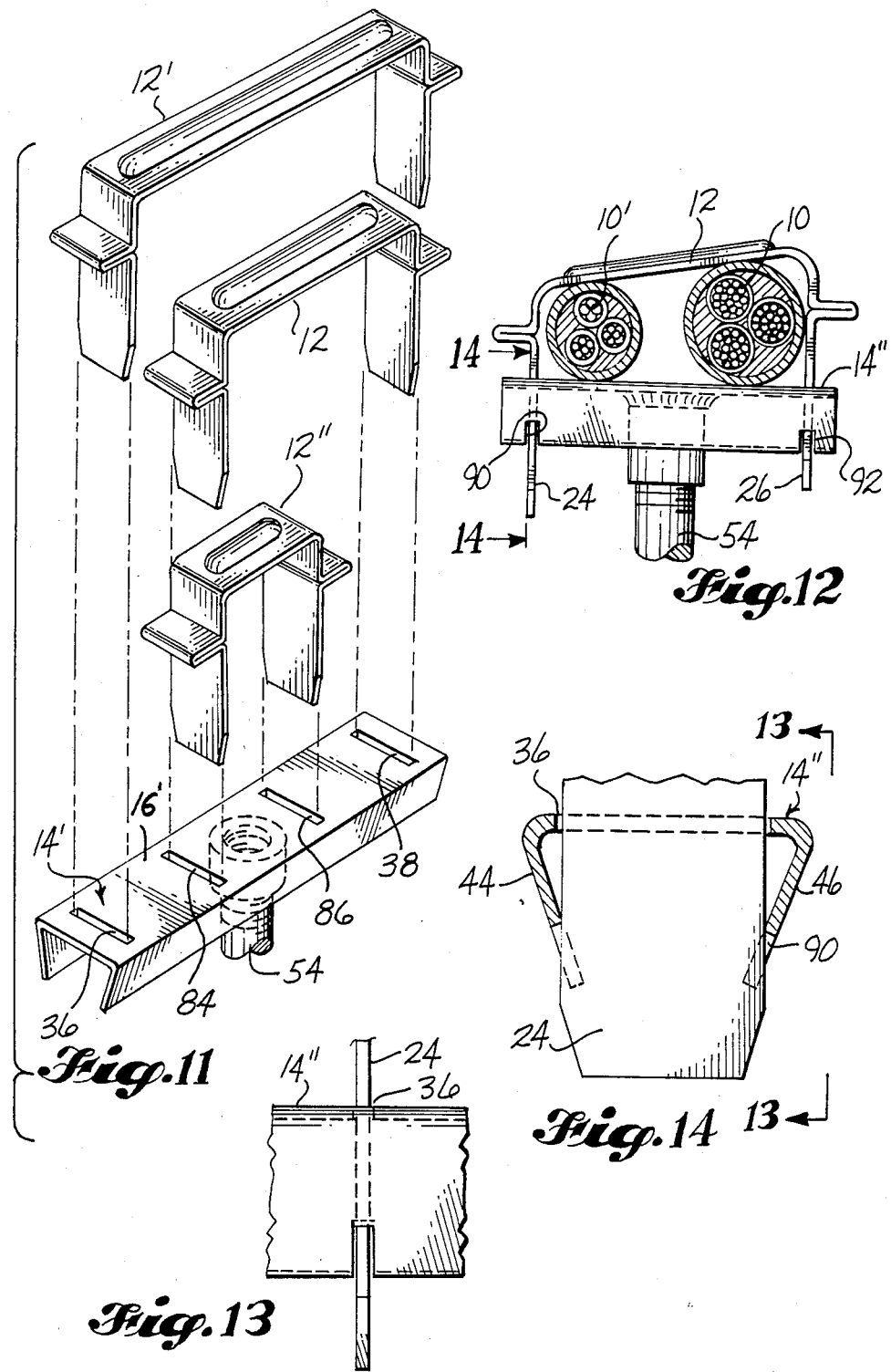

CONNECTOR ASSEMBLY FOR SECURING CABLES, PIPES, OR THE LIKE TO A SUPPORT STRUCTURE

DESCRIPTION

1. Technical Field

The present invention relates to an improved connector assembly adapted for quickly and easily connecting and disconnecting objects, such as cables, pipes, etc., to a support structure.

2. Background Art

Various types of connectors have been proposed or used for securing cables, pipes, and similar objects, to various support structures. The connector assembly of the present invention is considered to be an improvement on the type of connector assembly that is disclosed by U.S. Pat. No. 3,576,305, granted Apr. 27, 1971 to Richard L. Welsh and William R. Bodeen. This type of prior art connector assembly utilizes a flexible strap or band which fits through openings in a base member and about the object to be secured. The ends of the band are drawn together and are secured together by a clamp. Similar types of connector assemblies are disclosed by U.S. Pat. No. 3,087,700, granted in April of 1963 to Carpenter, and U.S. Pat. No. Re. 26,175, granted in March of 1967 to Wesseler. A disadvantage of this type of prior art connector assembly is that the strap must be tightly drawn about the object to be secured, and a clamp applied and/or the strap or a securement member must be bent as a part of the installation process and then restraightened during removal.

A principal object of the present invention is to provide a connector assembly which requires only a simple straight line plug-in movement of a retainer member relative to a base member in order to secure an object between the retainer member and the base member, and a simple and quick disassembly technique which permits an easy straight line pull of the retainer member away from the base member in order to free the objects, and which requires no tensioning and/or bending of a band member during installation or restraightening of such a member during removal.

DESCRIPTION OF THE INVENTION

The connector assembly of the present invention is basically characterized by a U-shaped retainer and a base member that is secured to a support structure. The U-shaped retainer comprises a pair of spaced apart sidearms, each having opposite edges, and a cross member. The base member comprises a support portion, a pair of slots in the support portion which are sized to receive the sidearms and are spaced apart a distance corresponding to the spacing of the sidearms, and a pair of laterally spaced apart grip jaws which are offset from the support portion and are positioned to receive between them the sidearms after the sidearms have passed through the slots. The grip jaws are spaced apart a distance less than the width dimension of the sidearms, so that the sidearms have to be forceably moved through the space between the grip jaws.

In use, an object or objects to be supported are positioned on the support portion of the base member, between the slots. Then the U-shaped retainer is moved towards the base member, to place the sidearms of the retainer in the slots. Then the U-shaped retainer is pushed upon to move the sidearms through the slots and then between the grip jaws until the cross member is generally against the object or objects to be retained. This causes the grip jaws of the base member to spread apart during insertion and then dig into and grip the edges of the sidearms at the end of insertion, to in that manner connect the U-shaped retainer to the base member, and secure the object or objects between the U-shaped retainer and the base member.

In accordance with one aspect of the invention, lever means are provided for spreading the grip jaws apart, for the purpose of releasing their grip on the edges of the sidearms when it is desired to disassemble the U-shaped retainer from the base member. In preferred form, the base member is channel shaped. The web of the channel provides the support portion which includes the slots. Free edge portions of the flanges of the channel form the grip jaws.

In preferred form, two cam levers are used for spreading apart the flanges when it is desired to disengage the retainer from the base member. Each cam lever comprises a slot, a handle extending in one direction from the slot, and a cam extending in the opposite direction from the slot size to fit into the space between the flanges of the channel. In use, a cam lever is positioned at each end of the channel. One of the flanges of the channel is aligned with the slots in the cam levers and the cams are aligned with the space between the flanges. Then, the cam levers are moved sideways to place the cams into the space between the flanges. Each cam includes an end portion spaced away from the slot which is configured to contact the inner surface of the second flange. It is also configured to push the second flange away from the first flange upon a swinging movement of the cam lever, to cause it to pivot about a point of contact of an edge portion of the first flange with a base portion of the slot.

In preferred form, the end of the cam includes a notch for receiving the free edge portion of the second flange when the cam lever has been swung in position an amount sufficient to spread the grip jaws apart a distance greater than the width dimension of the sidearm of the U-shaped retainer.

Other more detailed features of the invention are described below, as a part of the description of the best mode of the invention.

BRIEF DESCRIPTION OF THE DRAWINGS

In the drawing, like reference numerals are used to designate like parts throughout the several figures of the drawing, and:

FIG. 7 is an isometric view taken from the same aspect as FIG. 1, showing a pair of the cam tools, with one of them being installed at one end of the base member and the other one being spaced endwise outwardly from its installed position at the opposite end of the base member;

FIG. 8 is a view similar to FIG. 4, but showing the cam member installed on the base member, prior to its use;

FIG. 9 is a view like FIG. 8, but showing the cam member shifted in position, to cause a spreading apart of the grip jaws;

FIG. 11 is a view like FIG. 3, but of the embodiment shown by FIG. 10, and showing a plurality of selectively usable U-shaped retainer members spaced from their respective slots in the base member;

FIG. 12 is a view like FIG. 3, but of another embodiment of the invention, characterized by slots in the grip jaws of the base member, for receiving opposite edge portions of the sidearms of the U-shaped retainer;

FIG. 13 is an enlarged scale, fragmentary side elevational view, in the region of one of the slots, taken from the aspect of line 13—13 in FIG. 14; and FIG. 14 is a fragmentary sectional view taken substantially along line 14—14 of FIG. 12.

BEST MODE FOR CARRYING OUT THE INVENTION

Figure 1:
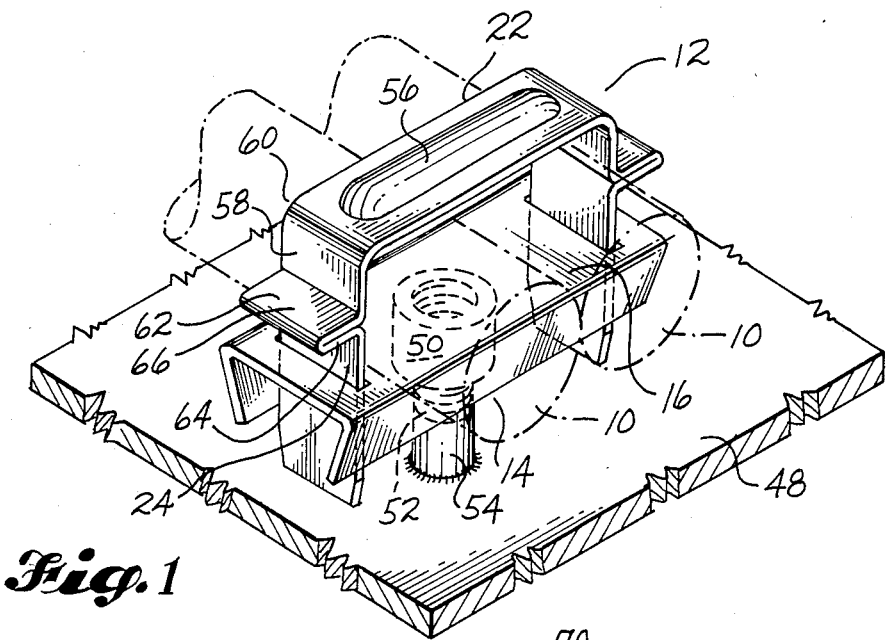
FIG. 1 is an isometric view of an embodiment of the invention, taken from above and looking towards one side and one end of the embodiment, such view showing a U-shaped retainer connected to a base member and including a phantom line showing of a pair of cables or pipes, representative of the type of objects that can be secured in place by use of the assembly.
Figure 2:
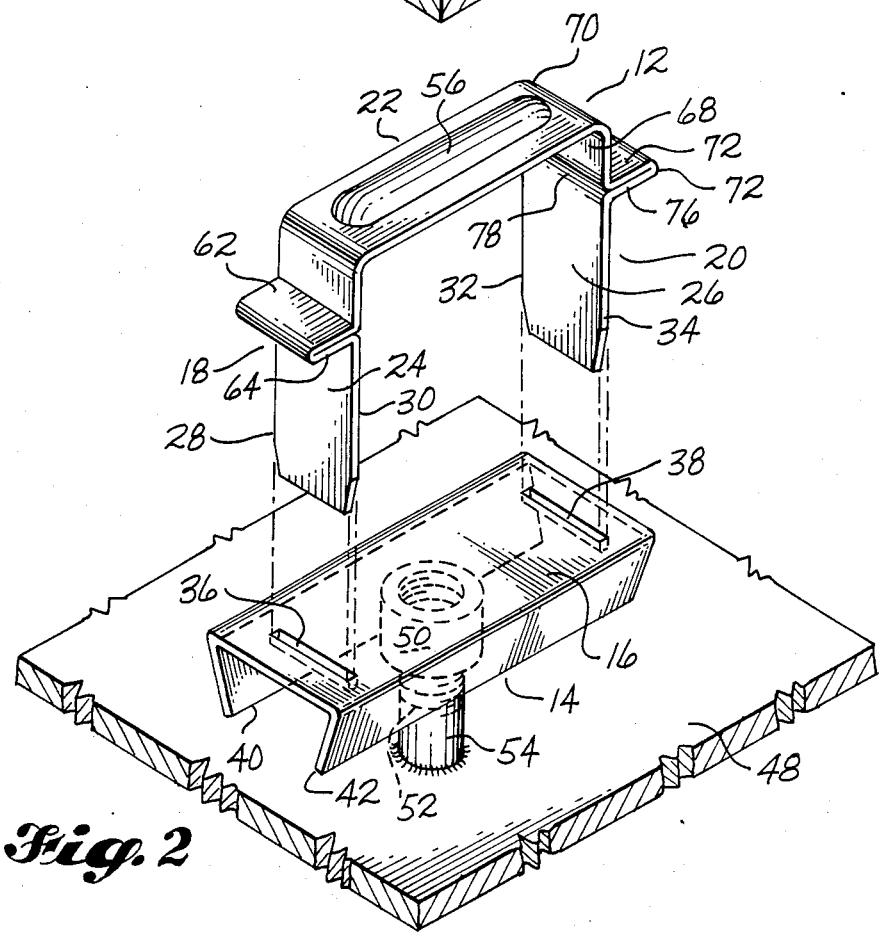
FIG. 2 is a view like FIG. 1, but showing the U-shaped retainer in a spaced relationship with the base member and omitting the objects.
Figure 3:
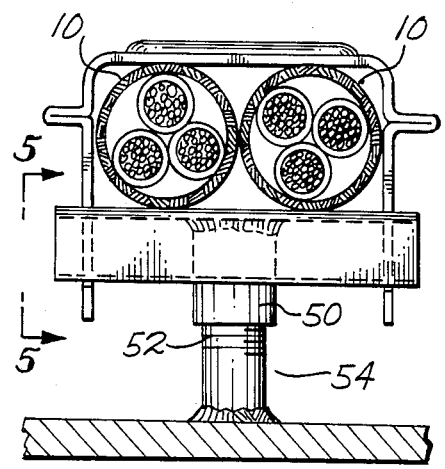
FIG. 3 is a side elevational view of the embodiment shown by FIGS. 1 and 2, showing the U-shaped retainer in an assembled position with the base member, securing two cables.
Figure 4:
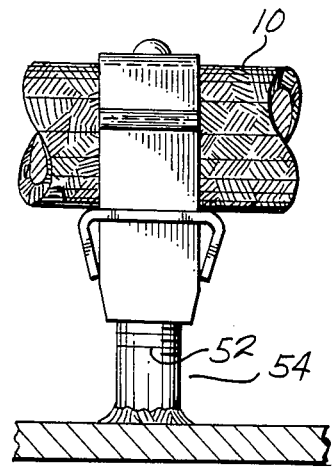
FIG. 4 is an end view of the assembly shown by FIG. 3.

FIGS. 1–4 disclose a first embodiment of the invention which is constructed to capture and secure a pair of objects, e.g. electrical cables 10. The connector assembly comprises a U-shaped retainer 12 and a base member 14. Base member 14 includes a support portion 16.

The U-shaped retainer 12 comprises a pair of spaced apart sidearms 18, 20 and a cross member 22. Arm 18 includes a main portion 24 which extends substantially parallel to a main portion 26 of arm 20. Arm portion 24 includes opposite edges 28, 30 which are parallel to each other. In similar fashion, arm portion 24 includes opposite edges 32, 34 which are parallel to each other.

The support portion 16 of the base member 14 comprises a pair of transverse slots 36, 38 which are spaced apart a distance corresponding to the spacing of the sidearms 18, 20. Slot 36 is positioned to receive arm portion 24. Slot 38 is positioned to receive arm portion 26. Base member 14 further includes a pair of spaced apart grip jaws 40, 42 which are offset from the support portion, and are positioned to receive between them the sidearm portions 24, 26.

Figure 5:
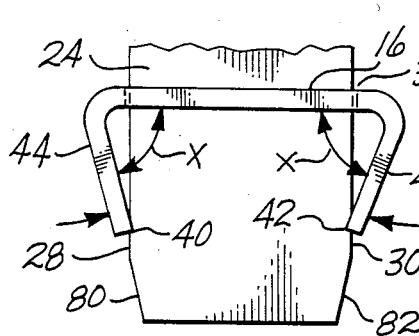
FIG. 5 is an enlarged scale fragmentary end view, showing the grip jaws of the base member penetrating into the edges of a sidearm of the U-shaped retainer.

In preferred form, the base member 14 is a channel member. The support portion 16 is the web of the channel. The grip jaws 40, 42 are edge portions of a pair of side flanges 44, 46, each of which makes an acute angle x (e.g. 75°) with the web 16. As best shown by FIG. 5, the grip jaws 40, 42 are spaced apart a distance that is less than the width distance of the sidearm portions 24, 26. As a result, the sidearm portions 24, 26 must be forcibly moved through the space between the grip jaws 40, 42.

In use, the cables 10, or other objects to be secured in position relative to a structural member 48, are laid on the support portion 16, between the slots 36, 38. Then, the U-shaped retainer 12 is positioned over the objects 10, with the sidearms 18, 20 outwardly of the sides of the objects 10, and with the end portions 24, 26 thereof in alignment with the slots 36, 38. Then the U-shaped retainer 12 is pushed upon to move the sidearm portions 24, 26 through the slots 36, 38, until the cross member 22 is generally against the objects 10. Forceful movement of the sidearm portions 24, 26 results in enough spreading apart of the flanges 44, 46, to allow such movement to occur. The flanges 44, 46 function as relatively stiff springs and the spring energy in them forces the grip jaws 40, 42 into tight gripping contact with the edges 26, 30 and 32, 34 of the arm portions 24, 26. The grip jaws 40, 42 actually dig into the edges 28, 30 and 32, 34, to in that manner securely connect the U-shaped container 12 to the base member 14.

In preferred form, the base member 14 is constructed to include a tubular stem 50 which is connected to a central portion of the web 16 and extends from it in the same direction as the flanges 44, 46. The tubular stem 50 may be internally threaded so that it can be screwed onto the threaded end portion 52 of a stud 54 which is welded or otherwise secured to the member 48. In the illustrated embodiment the stem 50 is an internally threaded tubular member which has been welded to the web 16. It is believed that such a member could also be formed integral with the web 16, by use of a deep draw process on a central portion of the web 16.

The U-shaped retainer 12 may be constructed from a single strip of sheet metal, formed and cut to the shape that is illustrated. The cross member 22 may be formed to include a longitudinally extending stiffening rib 56. The sidearms 18, 20 may be folded, in the manner illustrated, to remove some stiffness from them. In the illustrated embodiment, arm 18 includes a first portion 58 which makes a right angle corner 60 with the cross member 22. Arm portion 58 makes a right angle connection with a second part 62 which projects laterally outwardly from the arm 18. Part 62 is connected to a part 64 by a 180° bend 66. Parts 62, 64 are identical in size and shape and are juxtaposed. Part 64 makes a right angle corner in connection with portion 64 of the arm 18. Portion 24 and portion 58 are substantially coplanar.

In similar fashion, arm 20 includes a first part 68 which makes a right angle corner 70 with the cross member 22. Arm portion 68 makes a right angle connection with a second portion 72 which projects laterally outwardly from the arm 20. Arm portion 72 makes a 180° connection 74 with a third arm portion 76. Arm portion 74, 76 are juxtaposed, and are substantially coplanar with the portions 62, 64 of arm 18. Arm portion 76 makes a right angle connection 78 with arm portion 26. Arm portions 68 and 26 are substantially coplanar.

Preferably, the edges 28, 30 and 32, 34 are beveled at the lower end of the arm parts 24, 26. As shown by FIG. 5, the beveled regions 80, 82 of edges 28, 30 slope inwardly a sufficient amount that the width of the arm portion 24 (and arm portion 26 as well) at its end is smaller than the lateral distance between the jaws 70, 72. Thus, first contact of the grip jaws 40, 42 with the side edges 28, 30 and 32, 34 of the sidearms 18, 20 is in the beveled regions. The presence of the beveled regions allows easy entry of the ends of arm portions 24, 26 into the space between the grip jaws 40, 42. Then, in response to a pushing force on the U-shaped retainer 12, the sloping regions function to cam the grip jaws 40, 42 apart, to allow entry of the full width of the arm portions 24, 26 between the grip jaws 40, 42.

The dig in gripping action of the grip jaws 40, 42 into the edges 28, 30 and 32, 34 provides a very secure connection of the U-shaped retainer 12 to the base member 14. It is not necessary to bend the arm portions 24, 26 in order to secure the U-shaped retainer 12 in place. All that is required is a straight in pushing movement. As will hereinafter be described, disassembly is almost equally as easy.

Figure 10:
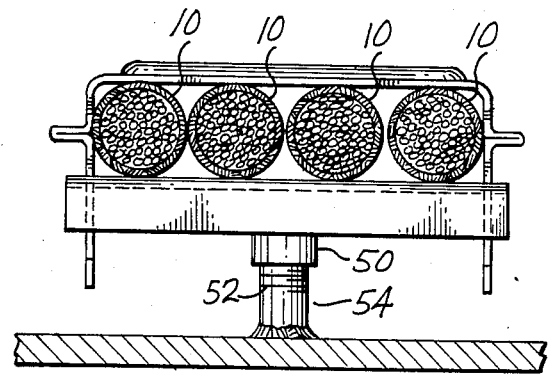
FIG. 10 is a view like FIG. 3, but of a modified embodiment of the invention.

FIG. 10 shows that the support assembly need only be widened in order to accommodate additional objects 10. As shown by FIG. 11, the support portion 16' of the base member 14' may be provided with a plurality of pairs of slots 36, 38, 84, 86, enabling the base member to be utilized with a plurality of sizes of U-shaped retainers. For example, a retainer like retainer 12, described above, can be used with the slots 84, 38, for securing two objects 10 in place on the base member 14'. A second, larger retainer 12' could be used with the slots 36, 38, for capturing and holding four of the objects 10. A smaller retainer 12" could be used with the slots 84, 86 for capturing and securing a single object 10 to the base member 14'.

As shown by FIGS. 12-14, the flanges 44, 46 may be provided with vertically disposed slots 90, 92 for receiving the edge regions of the arm portions 24, 26. In this embodiment, edges at the base of the slots 90, 92 constitute the grip jaws. As shown by FIG. 12, the slots 90, 92 kept the arm portions 24, 26 perpendicular to the surface 14" when unequal size objects 10, 10' are being held.

Figure 6:
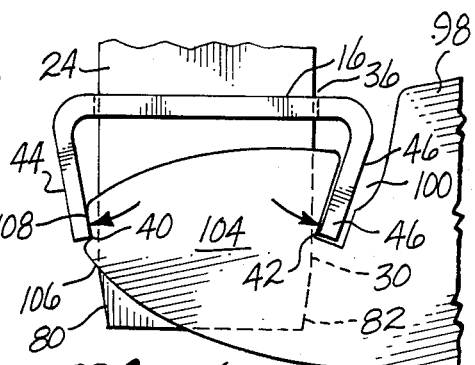
FIG. 6 is a view like FIG. 5, but including an end portion of a camming tool positioned to spring apart the spring jaws, to permit removal of the U-shaped retainer from the base member.

FIGS. 6-9 illustrate a manner of detaching the retainer 12 from the base member 14. Two tools 98, identical in construction, are used for springing apart the grip jaws 40, 42, an amount sufficient to allow the arm portions 24, 26 to be removed. Each tool 98 includes a fulcrum slot 100, a handle 102 projecting in one direction from the slot 100, and a cam 104 extending in the opposite direction from the slot 100. As best shown by FIG. 8, the cam 104 is configured to snugly fit into the space between the two flanges 44, 46, when the flange 46 is within the slot 100. The user need only bring the tools 98 into the position shown by FIG. 7, with the cams 104 in alignment with the ends of the space in base member 14 between the flanges 44, 46. The tools 98 are then moved sideways, to move the flange 46 relatively into the slots 100, and the cams 104 relatively into the space between the flanges 44, 46. Following this introduction, each tool 98 is in the position shown by FIG. 8. A curved cam surface 106 at the end of the cam 104 makes contact with the inner surface of flange 44, while flange 46 is within the slot 100. The curved surface 106 is appropriately curved so that when the handles 102 are lifted, to swing them upwardly, about a point of contact between the edge 42 of flange 46 and the base of the slot 100, the distance between this fulcrum point and the surface 106 in contact with edge 40 will increase. As this distance increases, the cam surface 106 in effect pushes flange 44 away from flange 46, i.e. it spreads the two flanges 44, 46 apart. The tools 98 are rotated upwardly until a notch 108 at the tip of each cam 104 moves into a position of engagement with the flange edge 40. This position is shown by FIG. 6. When the tools 98 are so positioned, the grip jaws 40, 42 have been spread apart enough that the lateral distance between the grip jaws 40, 42 is now less then the width of the arm portions 24, 26. The U-shaped retainer 12 can then be easily pulled away from the base member 14, to withdraw the arm portions 24, 26 out from the slots 36, 38. The tools 98 can then be easily removed. The spring energy in the flanges 44, 46 is sufficient that just as soon as the cams 104 are removed, the flanges 44, 46 will spring back into the position shown by FIG. 5.

Other modifications in the construction of the connector assembly could be made without departing from the spirit of the invention, as defined by the following claims. The claims are to be interpreted in accordance with the established rules of claim interpretation, including use of the doctrine of equivalents.

What is claimed is:

1. A connector assembly for securing cables, pipes, or the like, to a support structure, comprising:
    a U-shaped retainer comprising a pair of spaced apart sidearms, and a cross member, each said sidearm having opposite edges; and
    a base member comprising a support portion, a pair of slots in said support portion, spaced apart a distance corresponding to the spacing of the sidearms, each said slot being sized to receive a related one of said sidearms, and a pair of laterally spaced apart grip jaws offset from the support portion, and positioned to receive between them the sidearms after the sidearms have passed through said slots, said grip jaws being spaced apart a distance less than the width dimension of the sidearms, so that the sidearms have to be forcibly moved through the space between the grip jaws,
    whereby an object or objects to be supported may be positioned on the support portion of the base member, between said slots, and then the U-shaped retainer can be moved toward the base member, to place the sidearms of the retainer in said slots, and then the U-shaped retainer can be pushed upon to move the sidearms through the slots until the cross member is generally against said object or objects, and the grip jaws of the base member will dig into and grip the edges of the sidearms, to in that manner securely connect the U-shaped retainer to the base member, and hold the object or objects secure between the U-shaped retainer and the base member.

2. A connector assembly according to claim 1, wherein the cross member comprises a strengthening rib extending lengthwise of said cross member.

3. A connector assembly according to claim 1, wherein the U-shaped retainer is a sheet metal strip, and each sidearm has a first portion connected to the cross member and extending generally perpendicular from the cross member, a second portion connected to the first portion and extending generally perpendicularly outwardly from the first portion, a third portion connected to the second portion, said third portion being folded back in juxtaposition with the second portion, and a fourth portion connected to the third portion, said fourth portion extending substantially perpendicular to the second and third portions and being substantially coplanar with the first portion.

4. A connector assembly according to claim 3, wherein the cross member comprises a strengthening rib extending lengthwise of said cross member.

5. A connector assembly according to claim 1, wherein the base member is in the nature of a channel, said support portion is the web of the channel and the grip jaws are edge portions of a pair of flanges which extend at acute angles from the support portion.

6. A connector assembly according to claim 5, comprising means extending from the support portion of the base member, in the same direction as said flanges, for use in connecting the base member to a support structure.

7. A connector assembly according to claim 5, wherein said flanges are formed to include slots which are in alignment with the slots in the support portion, and edge portions of the sidearms fit into the slots in said flanges, and the rib jaws are edge surfaces formed at the bases of the slots in the flanges.

8. A connector assembly according to claim 1, further comprising cam lever means engageable with the grip jaws and operable for spreading the grip jaws apart, for the purpose of releasing their grip on the edges of the sidearms when it is desired to disassemble the U-shaped retainer from the base member.

9. A connector assembly according to claim 8, wherein the base member is in the nature of a channel, said support portion is the web of the channel and the grip jaws are free edge portions of a pair of flanges which extend at acute angles from the support portion, said cam lever means comprising a body including a slot, a handle extending in one direction from the slot, and a cam extending in the opposite direction from the slot, said cam being sized to be insertable into the space between the flanges, by placing the cam lever means at one end of the base member, with one of the flanges of the base member aligned with the slot in the cam lever means and the cam aligned with the space between the flanges, and then shifting the cam lever means sideways to place the cam into the space between the flanges, said cam including an end portion spaced away from said slot which is configured to contact the inner surface of the second flange, and which is configured to push said second flange away from the first flange upon a swinging movement of the cam lever means, to cause it to pivot about a point of contact of an edge portion of the first flange with a base portion of the slot in the cam lever means, and a swinging of the cam away from the support portion of the base member.

10. A connector assembly according to claim 9, wherein the end of the cam includes a notch for receiving the free edge portion of the second flange when the cam lever means has been swung in position an amount sufficient to spread the grip jaws apart a distance greater than the width dimension of the sidearm of the U-shaped retainer.

11. A connector assembly according to claim 1, wherein said base member comprises a plurality of pairs of slots of the type described, with each said pair of slots being adapted to receive the sidearms of a U-shaped retainer of the type described, having a spacing of its sidearms equal to the distance between the slots of said pair.

12. A connector assembly according to claim 11, wherein the base member is in the nature of a channel, said support portion is the web of the channel and the grip jaws are edge portions of a pair of flanges which extend at acute angles from the support portion.

* * * * *